Figure 1:
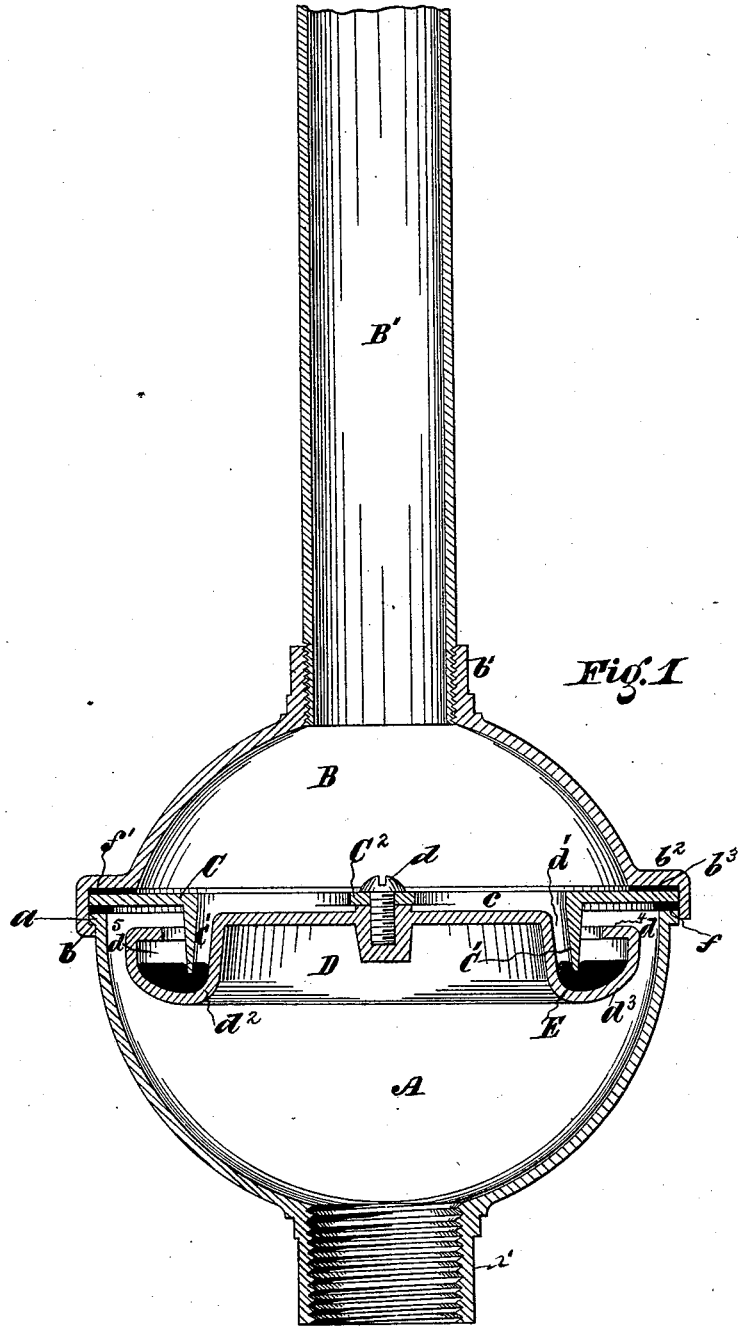

2 Sheets—Sheet 1.

J. BENNOR.
Seal-Joint Trap for Wash-Stands, &c.

No. 226,961. Patented April 27, 1880.

WITNESSES:
Saml. J. VanStavoren
W. P. Cowl

INVENTOR,
Joseph Bennor,
By Connolly Bros,
ATTORNEYS.

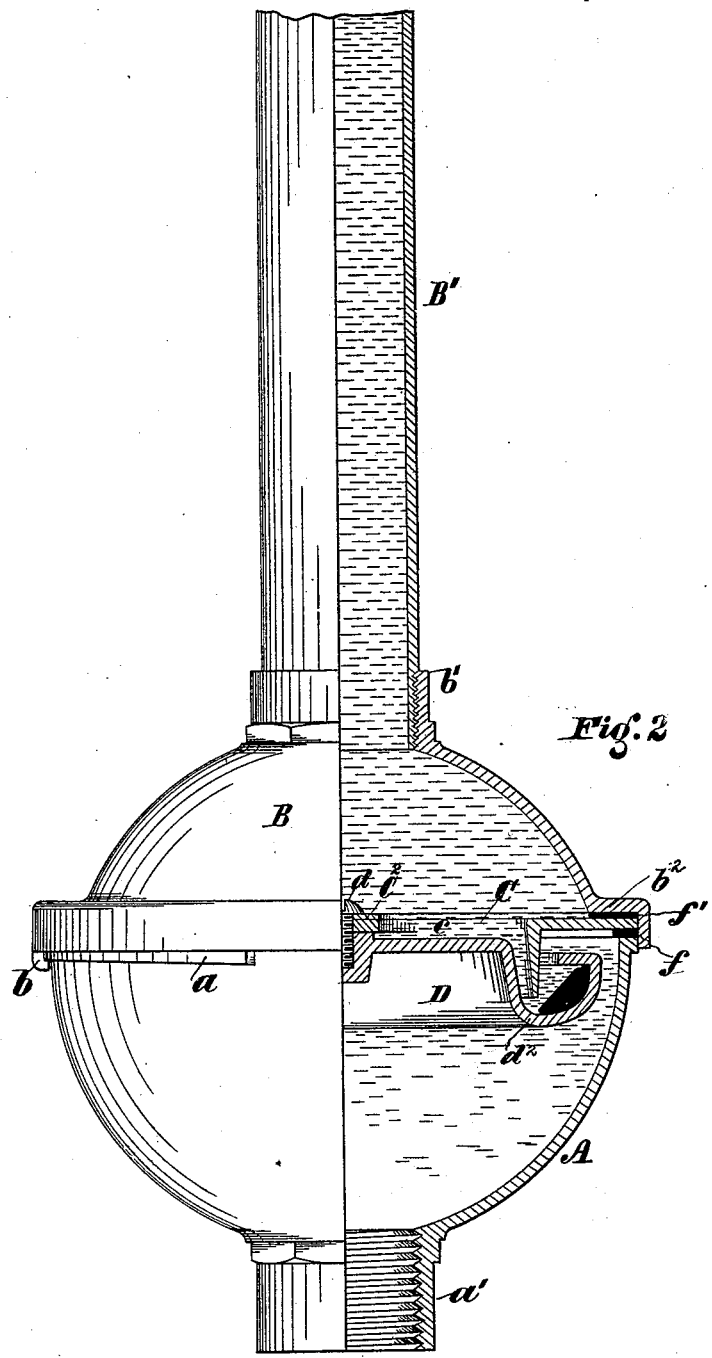

UNITED STATES PATENT OFFICE.

JOSEPH BENNOR, OF PHILADELPHIA, PENNSYLVANIA.

SEAL-JOINT TRAP FOR WASH-STANDS, &c.

SPECIFICATION forming part of Letters Patent No. 226,961, dated April 27, 1880.

Application filed November 20, 1879.

*To all whom it may concern:*

Be it known that I, JOSEPH BENNOR, of Philadelphia, in the county of Philadelphia and State of Pennsylvania, have invented certain new and useful Improvements in Seal-Joint Traps for Wash-Stands, Bath-Tubs, Urinals, &c.; and I do hereby declare the following to be a full, clear, and exact description of the invention, such as will enable others skilled in the art to which it pertains to make and use it, reference being had to the accompanying drawings, which form part of this specification, in which—

Figure 1 is a transverse vertical section of a trap constructed according to my invention, illustrated as being sealed; and Fig. 2 is a side elevation, partly in section, of the trap opened.

My invention has for its object to provide a fluid seal joint or trap the solid parts of which shall be stationary, to prevent the admission to dwelling-houses, &c., of sewer or other injurious gases and effluvia through the waste-pipes of wash-stands, bath-tubs, urinals, and like fixtures.

My improvements consist in the peculiar construction and combination of parts hereinafter referred to, whereby the mercury contained in the seal-trough of the trap may be displaced for the passage of the water or waste without being dislodged from the trough.

Referring to the accompanying drawings, A and B represent two hemispherical sections of iron, which are united by inclined lugs $a$ $b$ by screw-threads or equivalent means. Said sections are hollow, and have respectively threaded bosses $a'$ $b'$, whereby they are connected with a waste-pipe, B', or made to form a union for two lengths of such pipe. The section B is offset at $b^2$ to form an annular rabbet.

C is a diaphragm, which rests on the upper edge of the section A, a rubber washer, $f$, being interposed between it and said edge, and another like washer, $f'$, between it and the shoulder $b^3$. When the sections A and B are united the diaphragm C is held firmly in place, the joint around its edges being perfectly tight. The diaphragm C has a central opening, $c$, the edge of which depends to form an annular flange, C', and said opening is crossed by a bridge, C².

D represents a solid boss, whose diameter is less than that of the opening $c$, so that when fitted in said opening and secured, as it is, by a screw, $d$, to the bridge C², there will be left a free annular space, $d'$, between it and the flange C'. Said boss is formed with a continuous annular trough or channel, $d^2$, the outer wall, $d^3$, of which is curved to form an overhanging lip, $d^4$, between which and the wall proper is a chamber or space, $d^5$. Said trough is designed to receive the flange C', which enters thereto without touching any part of said trough. Said trough is further designed to receive mercury, (shown at E,) the proper depth therefor being only enough to submerge the edge of the flange C' or to rise slightly above said edge, but not to fill said trough.

The operation is as follows: The parts being arranged as shown, waste-water or other fluid flows down through the pipe B and into the trap or union formed of the sections A B. If the flow be at all violent, the waste fluid, which passes down the space $d'$, will make a passage through the mercury by displacing it, and will pass over the outer edge of the trough and thence downwardly. In this case the displacement of the mercury and the opening of the seal-joint which it produces with the flange C' will be effected by the momentum of the waste fluid impinging upon it, and such displacement will generally, if not invariably, be by forcing a passage through the mercury or by parting the latter, which remains, however, in the bottom of the trough. If, however, the flow be gentle, the waste fluid will accumulate above the mercury and inside the flange C' until its static pressure will be greater than that of the mercury. As soon as such overbalance is obtained the mercury will be displaced by being pushed outwardly and upwardly into the space or chamber $d^5$, leaving a free passage for the waste fluid, which will thereupon effect its escape. In both forms of displacement all, or substantially all, of the waste fluid will escape before the mercury will assume its normal position. As soon as the waste fluid has escaped the mercury will return to its original position and form a perfect seal-joint, preventing the ascent of gases through the trap.

As this device is not intended as a trap for pipes through which solid matters pass, care should be taken, by the provision of a screen in the basin or other fixture above, to prevent the admission of such solid matters to the trap.

What I claim as my invention is—

1. A trap having a fixed diaphragm, C, with depending flange and a stationary trough adapted and designed to contain mercury, into which said flange dips, operating to form a seal-joint which opens automatically by the displacement of the mercury, said trough being constructed and adapted to retain the mercury within it while allowing said displacement to be effected, substantially as set forth.

2. The combination of sections A B, diaphragm C, having opening $c$, flange C', and bridge $C^2$, with boss D, having trough $d^2$, adapted and designed to contain mercury and to prevent the overflow or spilling of the same, said parts constituting a stationary trap and seal-joint which opens automatically when the mercury is displaced by fluid above, substantially as set forth.

In testimony that I claim the foregoing I have hereunto set my hand this 14th day of November, 1879.

JOSEPH BENNOR.

Witnesses:
SAML. J. VAN STAVOREN,
CHAS. F. VAN HORN.